United States Patent
Beard

(10) Patent No.: US 10,053,290 B2
(45) Date of Patent: Aug. 21, 2018

(54) BIN CLAMP AND TOW ROPE

(71) Applicant: Robert Leroy Beard, Middleburg, FL (US)

(72) Inventor: Robert Leroy Beard, Middleburg, FL (US)

( * ) Notice: Subject to any disclaimer, the term of this patent is extended or adjusted under 35 U.S.C. 154(b) by 0 days.

(21) Appl. No.: 15/423,883

(22) Filed: Feb. 3, 2017

(65) Prior Publication Data
US 2017/0225895 A1    Aug. 10, 2017

Related U.S. Application Data

(60) Provisional application No. 62/291,153, filed on Feb. 4, 2016.

(51) Int. Cl.
*B65G 7/12* (2006.01)

(52) U.S. Cl.
CPC ..................................... *B65G 7/12* (2013.01)

(58) Field of Classification Search
CPC B65G 7/12; B65F 1/1468; B62B 5/06; B62B 5/064; B62B 17/061; B62B 2202/12; B62B 2202/20; B62B 2202/22; B60D 1/18
USPC ................ 294/15, 219; 280/19, 292; 16/428
See application file for complete search history.

(56) References Cited

U.S. PATENT DOCUMENTS

| | | | | | |
|---|---|---|---|---|---|
| 2,913,797 | A | * | 11/1959 | Hollis | B63B 21/54 114/230.26 |
| 4,281,612 | A | * | 8/1981 | Watts | B63B 21/04 114/221 R |
| 4,741,283 | A | * | 5/1988 | Conner | B63B 21/00 114/221 R |
| 5,154,131 | A | * | 10/1992 | Hall | B63B 21/54 114/230.3 |
| 5,251,944 | A | * | 10/1993 | Truitt | B65G 7/12 294/15 |
| 5,316,356 | A | * | 5/1994 | Nutting | A01M 31/006 119/807 |
| 5,351,365 | A | * | 10/1994 | Hauck | B65G 7/12 16/422 |
| 5,460,113 | A | * | 10/1995 | Gunter | B63B 21/00 114/230.2 |
| 5,902,015 | A | * | 5/1999 | Allcock | B25B 7/123 297/250.1 |
| 6,419,193 | B1 | * | 7/2002 | Rodriquez | B62B 3/106 248/101 |

* cited by examiner

*Primary Examiner* — Dean J Kramer
(74) *Attorney, Agent, or Firm* — Dunlap Bennett & Ludwig PLLC

(57) ABSTRACT

A towing apparatus is provided. The towing apparatus includes a clamp. The clamp includes a first arm and a second arm. Each of the first and second arms includes a handle portion and a gripping portion. The first and second arms are pivotally secured together in between the handle portions 12a and the gripping portions. A spring biases the gripping portions together. A first lock plate is pivotally secured to a distal end of the gripping portion of the first arm and a second lock plate is pivotally secured to a distal end of the gripping portion of the second arm. The towing apparatus further includes a rope attached to the clamp.

6 Claims, 3 Drawing Sheets

BIN CLAMP AND TOW ROPE

CROSS-REFERENCE TO RELATED APPLICATION

This application claims the benefit of priority of U.S. provisional application No. 62/291,153, filed Feb. 4, 2016, the contents of which are herein incorporated by reference.

BACKGROUND OF THE INVENTION

The present invention relates to transporting bins and, more particularly, to a bin clamp and tow rope that may be used for transporting bins.

Recycling and gardening bins are frequently too heavy to lift and move, especially for older people or the physically impaired.

As can be seen, there is a need for an improved device that aids users in moving bins.

SUMMARY OF THE INVENTION

In one aspect of the present invention, a towing apparatus comprises: a clamp comprising: a first arm comprising a handle portion and a gripping portion; a second arm comprising a handle portion and a gripping portion, wherein the second arm is pivotally secured to the first arm in between the handle portions and the gripping portions; a spring biasing the gripping portion of the first arm against the gripping portion of the second arm; a first lock plate pivotally secured to a distal end of the gripping portion of the first arm; and a second lock plate pivotally secured to a distal end of the gripping portion the second arm; and a rope comprising a first end and a second end, wherein the first end is secured to the clamp.

In another aspect of the present invention, a towing apparatus comprises: a clamp comprising: a first arm comprising a handle portion and a gripping portion; a second arm comprising a handle portion and a gripping portion, wherein the second arm is pivotally secured to the first arm in between the handle portions and the gripping portions; a spring biasing the gripping portion of the first arm against the gripping portion of the second arm; a first lock plate pivotally secured to a distal end of the gripping portion of the first arm; and a second lock plate pivotally secured to a distal end of the gripping portion the second arm; a rope comprising a first end and a second end, wherein the first end is secured to the clamp; and a ring-shaped handle secured to the second end of the rope.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a device for moving heavy recycling or gardening bins without having to lift them. The present invention easily attaches to a bin, allowing it to be pulled/slid to another location where the device is easily detached. The bin, without any encumbrance, is now available for access or collection. The device is very light and easily attached/detached and carried about.

Figure 1:
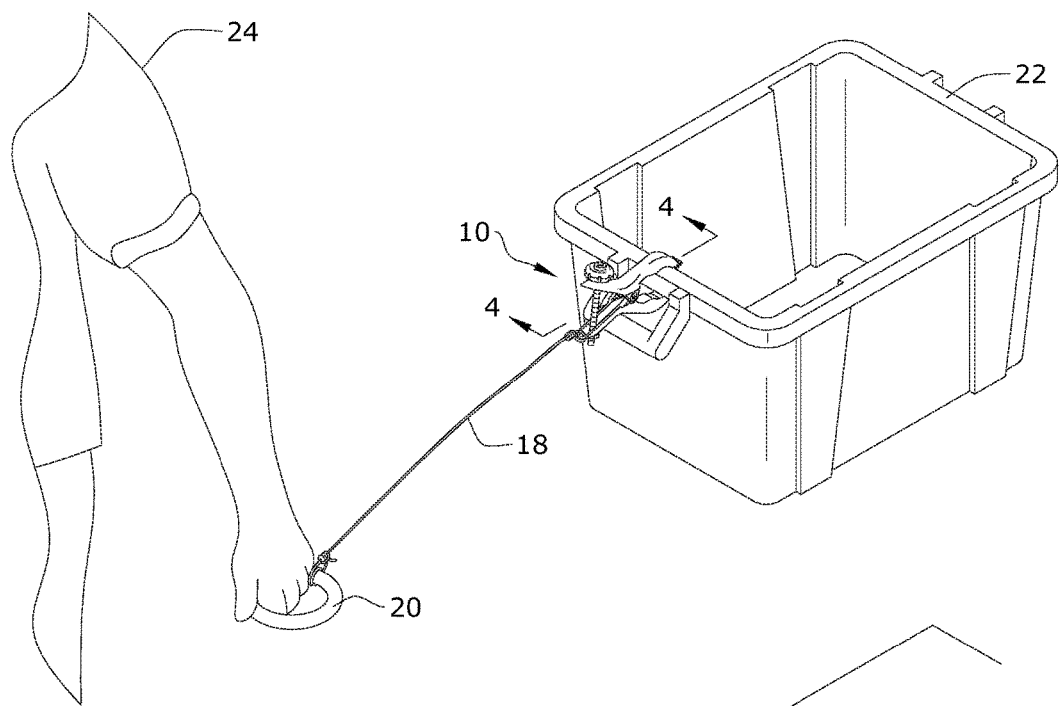
FIG. 1 is a perspective view of an embodiment of the present invention shown in use.
Figure 2:
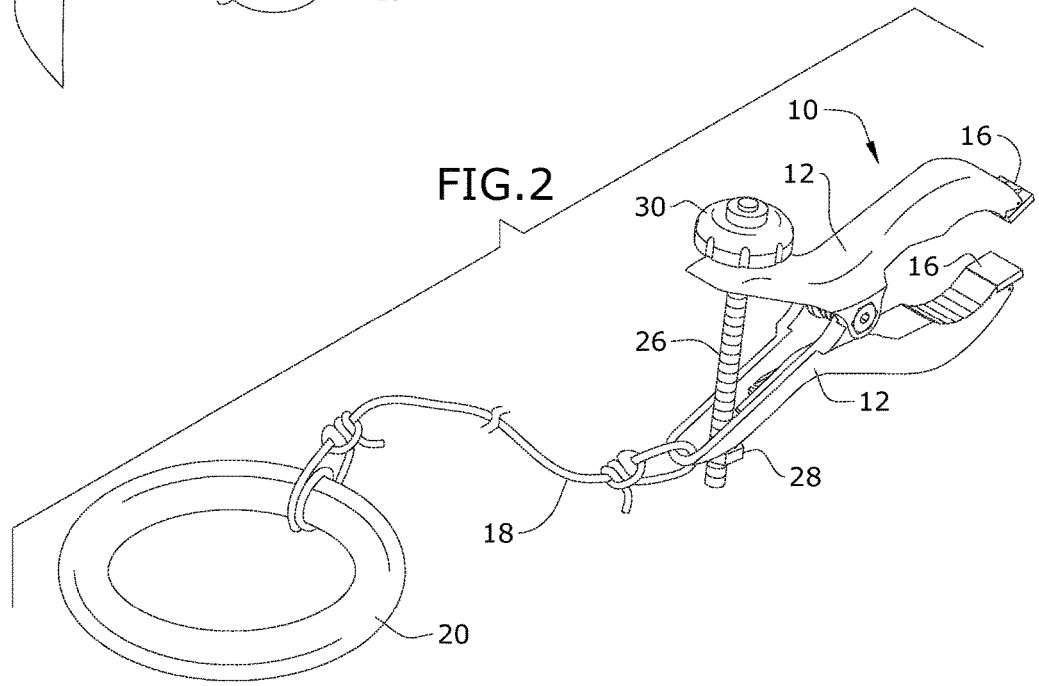
FIG. 2 is a perspective view of an embodiment of the present invention.
Figure 3:
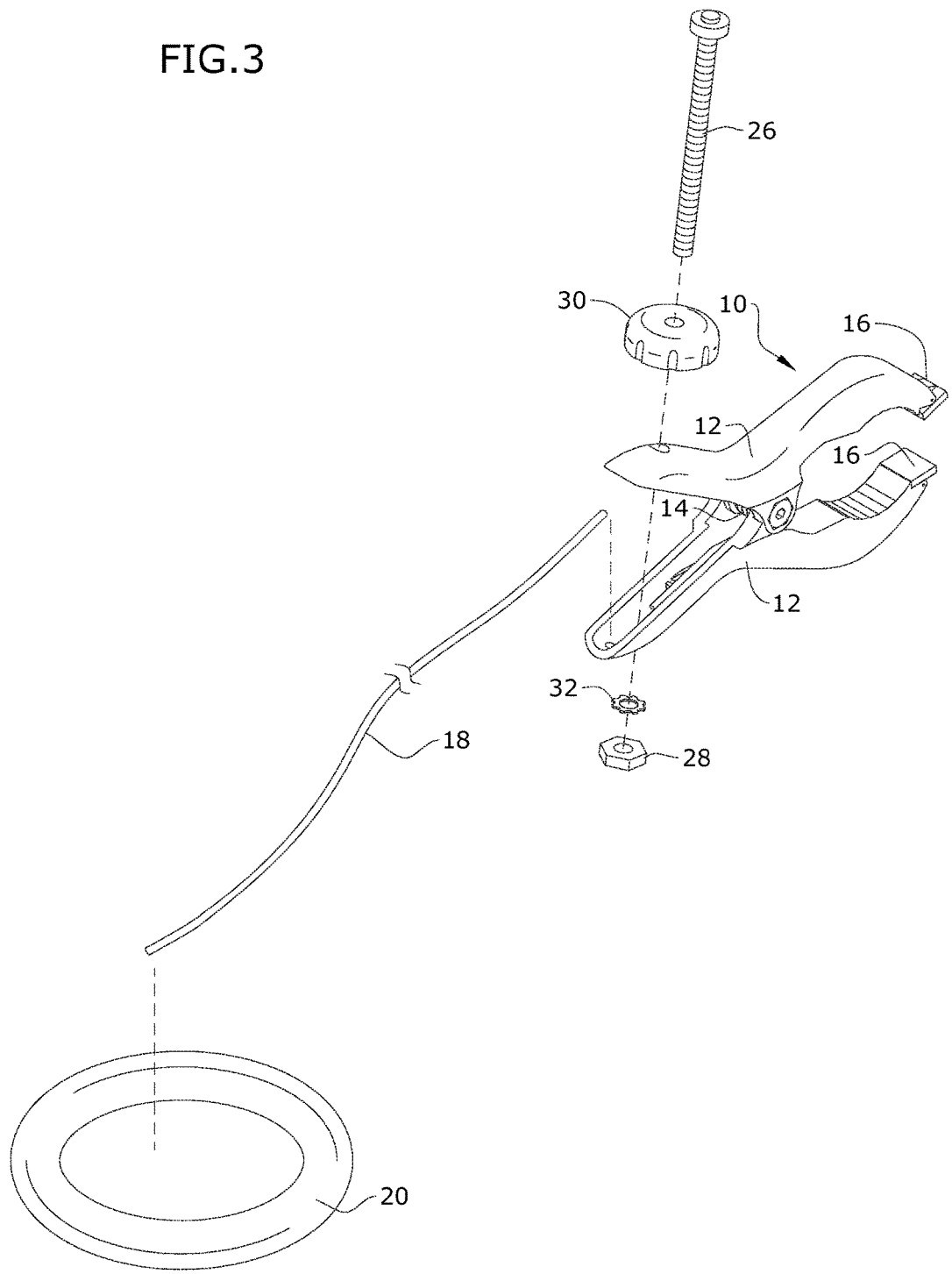
FIG. 3 is an exploded view of an embodiment of the present invention.
Figure 4:
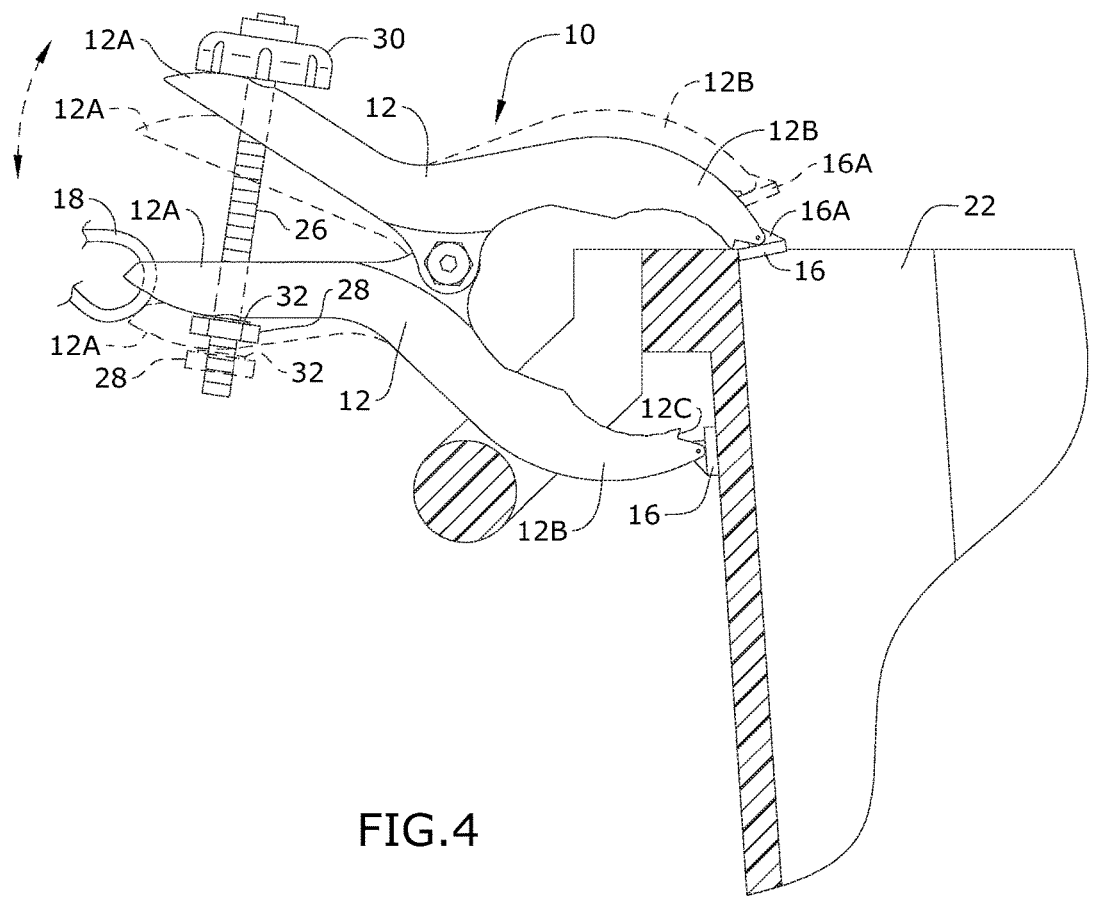
FIG. 4 is a section view taken from line 4-4 in FIG. 1.

Referring to FIGS. 1 through 4, the present invention includes a towing apparatus. The towing apparatus includes a clamp 10. The clamp 10 includes a first arm 12 and a second arm 12. Each of the first and second arms 12 includes a handle portion 12a and a gripping portion 12b. The first and second arms 12 are pivotally secured together in between the handle portions 12a and the gripping portions 12b. A spring 14 biases the gripping portions 12b together. A first lock plate 16 is pivotally secured to a distal end of the gripping portion 12b of the first arm 12 and a second lock plate 16 is pivotally secured to a distal end of the gripping portion 12b of the second arm 12. The towing apparatus further includes a rope 18 attached to the clamp 10.

The rope 18 of the present invention may include an elongated bendable cord having a first end and a second end. The first end of the rope 18 may be secured to the clamp 10. For example, one of the handle portions 12a may include an aperture. The first end of the rope 18 may pass through the aperture and may be tied to itself, thereby securing the rope 18 to the clamp 10. Alternatively, the first end of the rope 18 may be bonded or adhered to the clamp 10.

A handle 20 may be secured to the second end of the rope 18. The handle 20 may be made of a rigid material. In certain embodiments, the handle 20 may be in the shape of a looped ring. The second end of the rope 18 may be tied to the looped ring, thereby attaching the handle 20 to the rope 18. The ringed handle 20 is easy to grasp and also prevents the rope 18 from tying itself into knots. Taught line hitch knots may be used at the end of the rope 18 to adjust its length if needed.

Each of the lock plates 16 may include an outer flat surface, an inner surface and a flange 16a extending perpendicular from the inner surface. The flange 16a may include an aperture that aligns with apertures formed at the top of the gripping portions 12b. A pin may run through the aligning apertures, thereby pivotally securing the lock plate 16 to the clamp arms 12.

In certain embodiments, each of the distal ends of the gripping portions 12b of the first arm 12 and the second arm 12 may include a notch 12c sized to receive a portion of the lock plates 16. When the gripping portions 12b are biased together, the outer surfaces of the lock plates 16 may rest against each other and the inner surfaces of the lock plates 16 may nest within the notches 12c.

The present invention may further include a device to assist user's in squeezing the gripping portions 12a of the of the clamp 10 together. In certain embodiments, each of the gripping portions 12a include aligning openings. A screw 26 may run through the aligned openings. A threaded nut 28 and washer 32 may be secured to a first end of the screw 26 and a threaded handle 30 may be secured to an opposing end of the screw 26. The threaded handle 30 may be rotated a first direction to apply pressure against the gripping portions 12a and rotated in an opposing direction to relieve pressure from the gripping portions 12a.

A user 24 may use the present invention for dragging bins 22. To use the invention, the user 24 applies pressure i.e. squeezes the handle portions 12a together, and thereby urges the gripping portions 12b apart. The gripping portions 12b are placed over an edge of the bin 22 and the handle portions 12a are released. The gripping portions 12b are biased back together by the spring 14 and thereby apply pressure to the edge of the bin 22. The lock plates 16 pivot against the sidewalls of the bin 22, preventing the clamp 12 from sliding off of the bin 22. The clamp 10 is attached with the rope end of the clamp 10 facing down such that when pulling the bin 22, the rope 18 is approximately in line with the load in the bin 22. The user 24 may then grasp the handle 20 and drag the bin 22. Once reaching the final destination, the user 24 applies pressure for the handle portions 12a, and removes the clamp 10 from the bin 22.

It should be understood, of course, that the foregoing relates to exemplary embodiments of the invention and that modifications may be made without departing from the spirit and scope of the invention as set forth in the following claims.

What is claimed is:

1. A towing apparatus comprising:
   a clamp comprising:
      a first arm comprising a handle portion and a gripping portion;
      a second arm comprising a handle portion and a gripping portion, wherein the second arm is pivotally secured to the first arm in between the handle portions and the gripping portions;
      a spring biasing the gripping portion of the first arm against the gripping portion of the second arm;
      a first lock plate comprising an outer flat surface and an inner surface, wherein a flange extends from the inner surface and is pivotally secured to a distal end of the gripping portion of the first arm by a pivot pin; and
      a second lock plate comprising an outer flat surface and an inner surface, wherein a flange extends from the inner surface and is pivotally secured to a distal end of the gripping portion the second arm by a pivot pin; and
   a rope comprising a first end and a second end, wherein the first end is secured to the clamp.

2. The towing apparatus of claim 1, further comprising a handle secured to a second end of the rope.

3. The towing apparatus of claim 2, wherein the handle comprises a ring shape.

4. The towing apparatus of claim 1, wherein each of the distal ends of the gripping portions of the first arm and the second arm comprise a notch sized to receive a portion of the lock plates.

5. A towing apparatus comprising:
   a clamp comprising:
      a first arm comprising a handle portion and a gripping portion;
      a second arm comprising a handle portion and a gripping portion, wherein the second arm is pivotally secured to the first arm in between the handle portions and the gripping portions;
      a spring biasing the gripping portion of the first arm against the gripping portion of the second arm;
      a first lock plate pivotally secured to a distal end of the gripping portion of the first arm; and
      a second lock plate pivotally secured to a distal end of the gripping portion the second arm;
   a rope comprising a first end and a second end, wherein the first end is secured to the clamp; and
   a handle secured to the second end of the rope.

6. A towing apparatus comprising:
   a clamp comprising:
      a first arm comprising a handle portion and a gripping portion;
      a second arm comprising a handle portion and a gripping portion, wherein the second arm is pivotally secured to the first arm in between the handle portions and the gripping portions;
      a spring biasing the gripping portion of the first arm against the gripping portion of the second arm;
      a first lock plate pivotally secured to a distal end of the gripping portion of the first arm; and
      a second lock plate pivotally secured to a distal end of the gripping portion the second arm, wherein
      each of the distal ends of the gripping portions of the first arm and the second arm comprise a notch sized to receive a portion of the lock plates; and
   a rope comprising a first end and a second end, wherein the first end is secured to the clamp.

* * * * *